V. O. HOPKINS.
ICE CREAM SANDWICH MOLD.
APPLICATION FILED OCT. 26, 1915.
1,183,731.
Patented May 16, 1916.
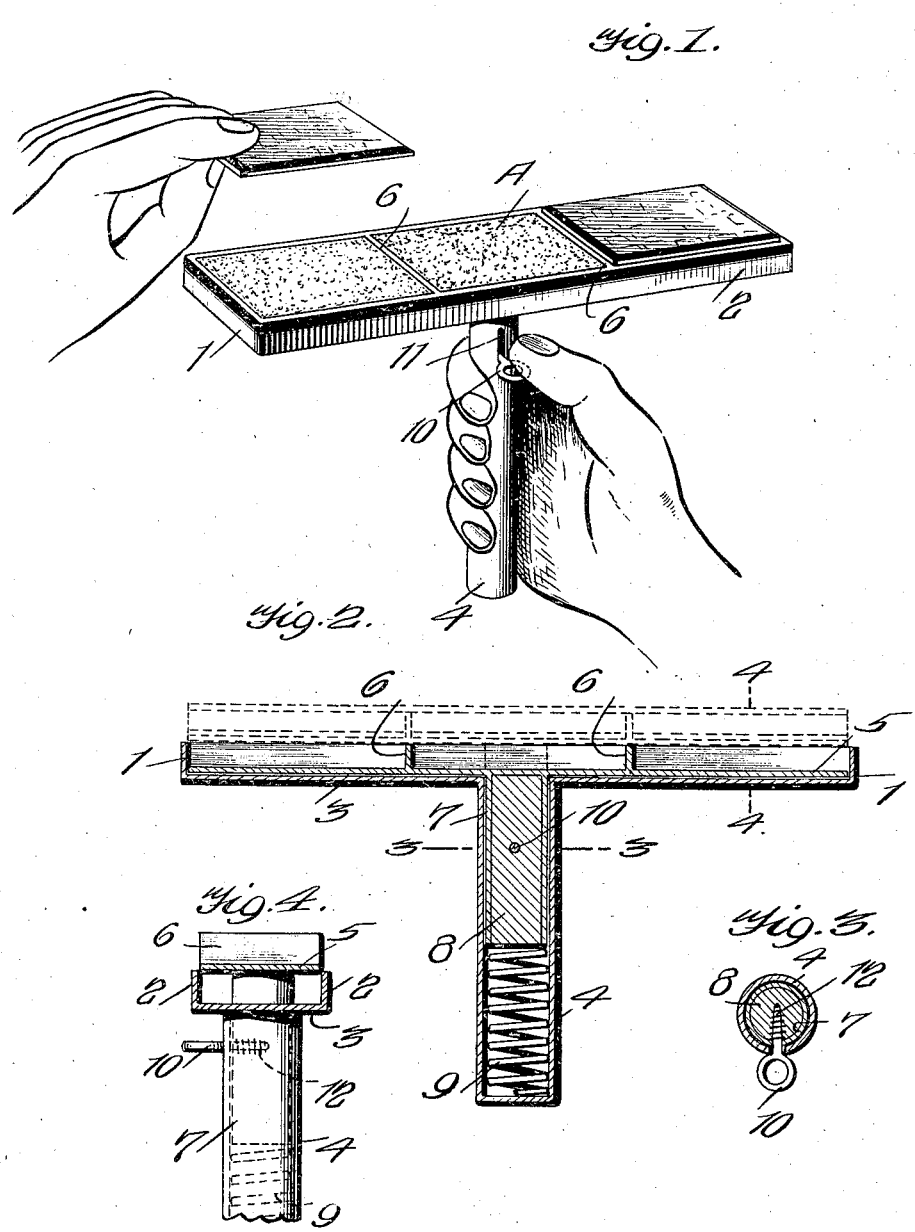
WITNESSES:
INVENTOR
VIRTUE O. HOPKINS,
BY Munn & Co
ATTORNEYS

UNITED STATES PATENT OFFICE.

VIRTUE OGDEN HOPKINS, OF WINSTON-SALEM, NORTH CAROLINA.

ICE-CREAM-SANDWICH MOLD.

1,183,731.	Specification of Letters Patent.	Patented May 16, 1916.

Application filed October 26, 1915. Serial No. 57,981.

*To all whom it may concern:*

Be it known that I, VIRTUE O. HOPKINS, a citizen of the United States, and a resident of Winston-Salem, in the county of Forsyth and State of North Carolina, have invented certain new and useful Improvements in Ice-Cream-Sandwich Molds, of which the following is a specification.

The main object of my invention is to provide a mold especially adapted for making sandwiches from ice-cream, frozen sherbet, etc., in which two, three or more sandwiches may be formed and ejected from the mold at one operation.

A further object is to provide means for quickly taking the mold apart in order to clean the same.

A still further object of my invention is to provide mechanism in the handle of the mold for automatically ejecting the sandwiches when formed.

With such objects in view, and others which will appear as the description proceeds, my invention comprises various novel features of construction and arrangement of parts which will be set forth with particularity in the following description and claims appended hereto.

In the accompanying drawings which illustrate one embodiment of my invention, and wherein like reference characters indicate like parts, Figure 1 is a perspective view of my device showing the method of operating the same. Fig. 2 is a vertical longitudinal section of my invention. Fig. 3 is a transverse section of the handle taken on line 3—3 of Fig. 2. Fig. 4 is a vertical section on the line 4—4 of Fig. 2.

The tray A in which the sandwiches are formed, consists of ends 1, and sides 2 rising from the bottom 3, which is supported upon the hollow handle 4, closed at its lower and open at its upper end. A false bottom 5 fits snugly within the tray and is divided by upwardly projecting partitions 6 into a plurality of molds, the shape of the sandwiches which it is desired to form. This false bottom is supported upon a hollow rod 7, open at its lower end, and adapted to slide within the hollow handle 4. A block of wood 8, fits snugly within the rod 7 which is shorter than the handle 4, and a coiled spring 9 is interposed between the rod and the bottom of the handle to normally project the false bottom above the tray A.

A push pin 10 is detachably secured to the rod 7 and projects through a vertical slot 11 in the handle, whereby the false bottom may be manually forced down within the tray against the tension of spring 9. The upward movement of the false bottom is limited by the push pin striking the top of the slot 11. The inner end of the push pin is made in the form of a standard wood screw 12, adapted to be screwed into the wooden block 8 through a suitable opening in the rod 7. By this construction the pin may be removed and the rod 7, with the false bottom, taken from the mold for the purpose of cleaning the same.

When it is desired to make the sandwiches, the push pin is pressed down until the false bottom rests upon the bottom of the tray. A cracker is inserted in each of the molds thus formed by the false bottom, the ends of the tray and the partitions upon the false bottom, and the space filled with ice cream. A second cracker is then placed on the ice cream and the push pin released whereupon the false bottom is forced upward by the spring. The sandwiches are thereby lifted completely out of the tray and into a position to be easily manipulated.

By increasing the size of the tray and the false bottom, as many sandwiches may be made at one operation as desired.

To clean the mold, the push pin is removed and the rod 7 slipped from the handle so that all parts of the device are exposed.

If desired, the push pin may be pressed down only a fraction of its stroke when forming sandwiches, thereby forming a sandwich of reduced thickness.

When it is desired to pack the ice cream very firmly in the sandwich, the false bottom is depressed a fraction of its stroke and held against the tension of the spring. The shallow mold thus formed is filled with ice cream and the false bottom is then depressed further, forming a deeper mold which is then filled. By thus packing the ice cream in layers it can be packed very firmly in the sandwich.

I claim:—

1. A mold comprising a shallow elongated tray, a hollow handle depending therefrom, a false bottom within the tray having upstanding transverse partitions thereupon, a rod depending from the false bottom and sliding within the hollow handle, a spring interposed between the bottom of the said rod and the bottom of the handle and exerting a constant upward pressure upon the false bottom, and a push pin detachably secured to the said rod and projecting through a slot in the said handle whereby the false bottom may be forced downward either partially or to the full extent of its stroke against the action of the said spring, the movement of the false bottom being limited by the length of the said slot.

2. A mold comprising a shallow elongated tray, having a handle depending therefrom, a false bottom within the tray having upstanding transverse partitions thereupon, forming a plurality of molds with the false bottom as their base and the sides of the said tray and the upstanding partitions as the sides thereof and means for automatically projecting the false bottom upwardly on a line with the top of the tray and means for manually retracting the false bottom partially or completely within the tray.

3. A mold comprising a tray, a hollow handle depending therefrom, a false bottom within the tray having a rod extending within the hollow handle, a spring interposed between the bottom of the rod and the bottom of the handle normally projecting the false bottom upward on a line with the top of the tray and a push pin secured to the said rod and projecting through the said handle for manually retracting the false bottom partially or completely within the tray against the action of the said spring.

VIRTUE OGDEN HOPKINS.

Witnesses:
  HY F. SHAFFNER,
  J. F. BROWER, Jr.